July 30, 1974   J. A. LECOURT   3,826,637
MANUFACTURE OF FLAT GLASS BY FLOTATION
Filed Sept. 21, 1972   3 Sheets-Sheet 1
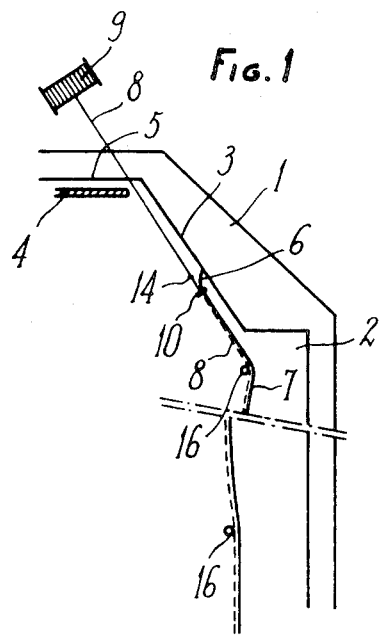
Fig.1
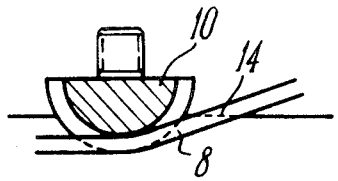
Fig.2
Fig.2a
Fig.2b
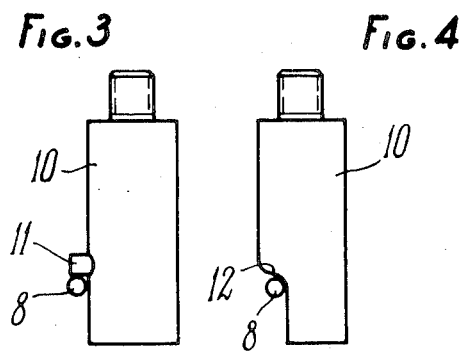
Fig.3   Fig.4
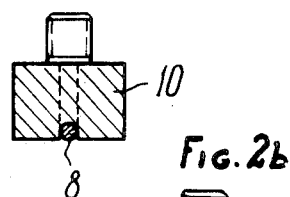
Fig.6
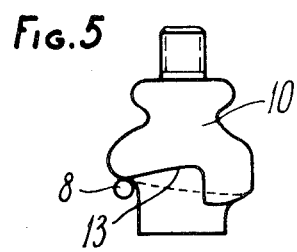
Fig.5
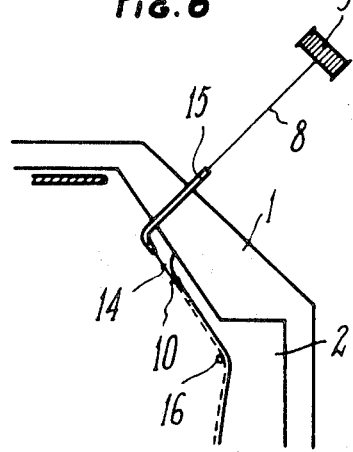

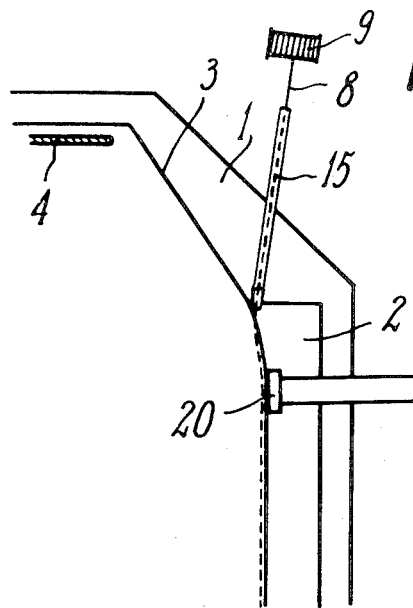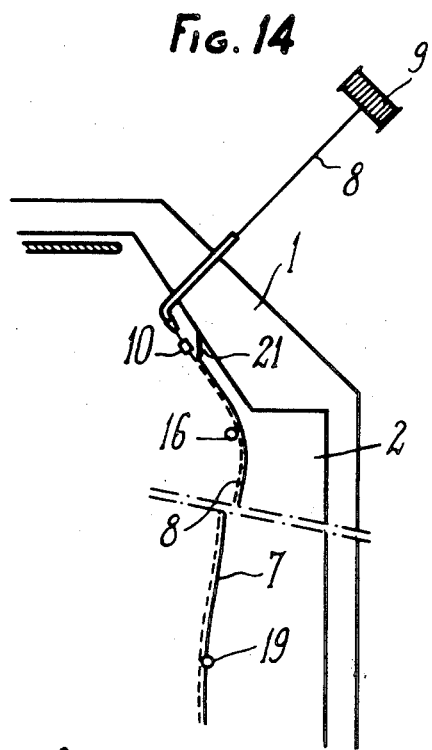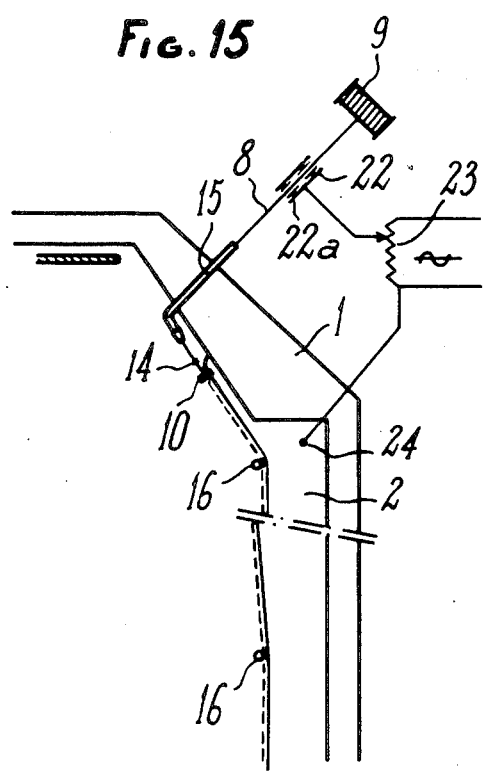

United States Patent Office

3,826,637
Patented July 30, 1974

3,826,637
MANUFACTURE OF FLAT GLASS BY FLOTATION
Jean Albert Lecourt, Villejuif, France, assignor to Saint-Gobain Industries, Neuilly-sur-Seine, France
Filed Sept. 21, 1972, Ser. No. 290,874
Claims priority, application France, Aug. 26, 1971, 7130968
Int. Cl. C03b 18/02
U.S. Cl. 65—182 R    7 Claims

ABSTRACT OF THE DISCLOSURE

A method of making flat glass which comprises depositing molten glass upon the upstream part of a molten flotation bath, drawing the glass downstream over the bath and spreading the glass over the bath between divergent retaining means by the forces of gravity and surface tension, thereby forming a moving ribbon, introducing moving, flexible guide means into the edges of the ribbon at an upstream location, and establishing the dimensions of the ribbon by coordinating the distance between the flexible guide means, the speed of the ribbon, and the tension on the flexible guide means. Simple and effective apparatus are provided to carry out the process.

---

This invention relates to the continuous manufacture of flat glass by flotation on a liquid support denser than the glass, a method which produces products having combined qualities of brilliance of surface or fire polish, general levelness and uniform thickness at a moderate cost. It is known that such a method of fabrication includes the steps of pouring the glass onto a flotation bath in an elongated tank, allowing the glass to spread out freely and form a ribbon on the surface of the bath, drawing the ribbon over the bath toward the downstream end of the tank, and cooling the ribbon as it progresses until it is sufficiently hardened at the end of the bath to be handled mechanically without damage.

The viscosity of the glass floating on the bath is at first kept at a relatively low value so as to produce rapidly a thickness of the ribbon which is uniform and stable, and is derived from the interplay of gravity and surface tension. As the ribbon is drawn over the bath it is progressively cooled until it attains a rigidity sufficient to be drawn out of contact with the bath by mechanical means without being damaged to an extent sufficient to affect its levelness and its surface polish.

The thickness of ribbons thus produced is, under usual conditions, on the order of 6–7 mm., which is called equilibrium thickness, when the liquid support is tin or one of its alloys, the stabilized thickness being imposed by gravity and the surface tension of the glass and of the bath.

When it is intended to produce a thinner sheet one can, after the glass has freely expanded, cool it, grip it laterally by edge retaining means which control the speed of the ribbon along the bath then reheat the glass so as to impose upon it downstream of the zone of free expension a longitudinally directed force which reduces its thickness.

According to other modes of operation thickness of the ribbon greater than 7 mm. can be obtained by restricting the spreading out of the glass before it has reached equilibrium thickness by means of barriers disposed on opposite sides of the ribbon, these barriers being confining while the ribbon is being formed and being fixed or movable at the same speed as the ribbon. According to another process called Ariane which is described in French Pat. 1,378,859 and its additions 86,221, 86,222, 86,817, 87,798, and 91,543 filed in the name of Compagnie de Saint-Gobain, the glass is poured onto the metallic bath in a basin upstream of the tank and the glass ribbon is formed between upstream retaining elements and moving guide elements which are continuous and flexible and adhere to the glass at the edges and accompany it during its movement over the bath, sometimes being used to produce that movement.

These guide elements act on the width of the ribbon, in effect modifying the process which produces equilibrium. The spreading out of the glass inside a closed space allows the production in the hot zone of the furnace of a ribbon of which the thickness deviates from the stabilization value of 6–7 mm.

According to improvements constituting the object of additions 86,817, 87,798, and 91,543, one may use auxiliary means consisting essentially of fixed elements deposited in pairs on opposite sides of the glass ribbon; sometimes only one of these may be used. By this means one may give to the lateral guide elements a spacing which is wider than that which corresponds to the natural equilibrium thickness because the guide elements are capable of passing outside of positioning elements which penetrate the glass without being thereby separated from the glass. The Ariane process gives important advantages, in particular directly producing sheet dimensions (thickness and width) very close to the final dimensions required, with high quality surfaces derived from a rapid spreading out of the glass at the high temperatures at which it is poured. Especially in the Ariane process, the width of the ribbon of glass may be made practically independent of its thickness, undergoing even for thin ribbons, little variation along the length of the tank. Such an installation may be made in the following way: The width of the tank should be practically uniform from one end to the other and as narrow as possible in order that as much as possible of the surface of the bath shall be used, that is to say that the bath should be covered by the glass ribbon throughout the largest part of its width; the protection of the exposed part of the flotation bath by suitable gases may be thus directed principally upon the areas which are not covered by the glass, reducing the consumption of such gases.

The cooling of the ribbon may be more rapid and the intermediate reheating of the glass eliminated, the length of the tank, and the consumption of heating energy, being substantially reduced for the same capacity of production.

The operation of the installation is very flexible and permits changes to be made in the thickness of the ribbon and rates of drawing. The width of the ribbon depends less directly from the manufactured thickness but it remains important even in the case of the manufacture of thin sheets which are not drawn at excessive speeds.

The present invention has among its objects, while obtaining all of the advantages mentioned hereinabove and others which are particularly important, to use methods and installations in which the tank containing the liquid metal is simplified and in particular which does not have upstream apparatus including fixed retaining means (such as weirs, submerged barriers, rollers in contact with the glass) and which, in particular, allows the Ariane process to be put into operation in a furnace of the simple type which was used originally.

The invention also has as an object a process which involves pouring the glass directly onto the metallic bath at the upstream part of the tank between divergent retaining means composed of material which is wetted by the glass, allowing the glass to spread out between the retaining means under the action of gravity and of traction exercised on the ribbon downstream, while introducing through the upper face of the glass at the edges of the ribbon, before or immediately after they have left the divergent retaining means, some flexible guides which are movable and which diverge in the zone downstream of ribbon formation and which control the spreading out of the glass in that zone, accompanying and guiding the ribbon on its course and during its progressive cooling.

This process assures the confinement of the sheet of glass about its perimeter by means to which it adheres strongly and permits, by regulating the position of the parts of this apparatus and the displacement of those among them which are movable, control of the spreading out of the sheet and to produce thickness of sheets which are widely different from those which correspond to the thickness of natural equilibrium, these controlled thicknesses being either less than or greater than that of equilibrium thickness, at will.

By adjusting the tension applied to the flexible guide elements and the distance between the positioning elements, it is possible to control the width of the sheet of glass. Such regulation as well as that which is related to the speed with which the ribbon is drawn, in relation to the rate at which the glass is poured onto the bath, permits the adjustment of the thickness of the glass at a selected value.

Other characteristics and advantages of the invention will be derived from the description which follows and which reveals preferred forms of apparatus as non-limitative examples.

The drawings are diagrammatic and are described as follows:

FIG. 1 is a partial plan view of an installation according to the invention, it being understood that the other side of the tank will be in effect a mirror image of what is shown.

FIGS. 2, 2a, and 2b are vertical, sectional views of guides for introducing flexible guide wires into the glass.

FIGS. 3-5 are elevational views of positioning elements.

FIG. 6 is a view similar to FIG. 1 showing the modified means of introducing the flexible guide wires into the glass.

FIGS. 13-15 are views similar to FIG. 1 illustrating modifications of the basic invention.

Figure 7:
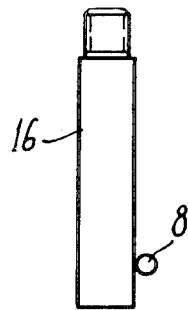
FIGS. 7-9 are elevational views of different types of positioning elements.

As represented in FIG. 1 the installation includes a tank of which a part is indicated by 1, this tank containing a molten metal bath 2, for instance tin. The upstream part of the tank has divergent walls 3, diverging downstream. The heating means and means for conditioning the atmosphere may be of standard types and are not shown.

The molten glass is admitted at the upstream end of the tank in the region indicated at 4, by an open canal. It spreads out over the bath of liquid metal and wets the upstream wall 5 as well as the diverging lateral walls 3 down to a point 6 where the glass is detached from the walls and drawn off as a ribbon taking approximately the configuration shown at 7 under the action of mobile guide elements 8 which are drawn steadily under selected tension from the upstream end toward the downstream end of the tank, becoming embedded in the edges of the glass during their movement. The movable guide elements may consist of simple wires, for example of a diameter of about 2 mm. of mild steel or of iron alloy having good mechanical and chemical characteristics at elevated temperatures. These guide elements may also be shaped as ribbons and fabrics.

Each wire 8 is drawn from a roll 9 and enters the furnace at a level above that of the mass of fused glass, which is spreading out on the metallic bath. The wire then engages a guide 10 which is arcuate and grooved to receive the wire and directs the wire downward into the glass as indicated in FIG. 2. It is advantageous to arrange this guide so that the wire 8 enters the glass before it passes under the guide, which lubricates the wire and reduces the frictional forces between the wire and the guide.

One may also provide near the guide a small barrier 6 which constitutes an obstacle to the flow of the glass, this barrier being situated between the arcuate guide and wall 3. It provokes a local increase in the thickness of the glass which facilitates the immersion of the wire in the sheet of glass.

The guides 10 are constructed so as not to undergo appreciable wear due to friction or to corrosion by the molten glass.

FIGS. 2 and 2a show a form of guide 10 including a semi-cylindrical block of molybdenum or tungsten faced with alumina. FIG. 2b shows a similar guide which is useful in the manufacture of thick glass.

FIGS. 3-5 show examples of guides for similar use. In FIG. 3 the guide has a projecting pin 11 under which the flexible guide wire passes. In FIG. 4 the flexible guide wire passes under a shoulder 12 in the guide itself. In FIG. 5 the flexible guide wire passes under ramp 13 which is formed in the body of the guide.

The guides are maintained by rigid supports which may be heated or cooled so as to permit a fine and stable regulation of their positions.

It has been demonstrated in that the location of the guides 10 which control the point 14 where the guide elements enter the glass, constitutes one of the factors which determines the good operation of the installation. It has been established in particular that with furnaces in which the divergent retaining means or walls 3 form an angle between them of 70° preferred results are obtained, both with respect to the quality of the sheets obtained as well as the flexibility of operation of the apparatus by disposing the guides 10 near the downstream extremity of the lateral walls at a distance of one from the other about two-thirds of the width of the ribbon which is to be produced, it being understood that this distance is subject to regulation. It is also important to note that the positioning of the bearing surface of the guide surface of the guides 10 should be such that the flexible wires do not come in contact with the metallic bath.

In the apparatus represented in FIG. 1 the guide element follows a straight-line between spool 9 and the point 14 where the wire enters the glass. In practice it may be even more advantageous to introduce the flexible guide through a conduit 15 as in FIG. 6, which imposes a change in direction, this construction enabling one to locate the spools at the sides of the furnace. The orifice of the conduit 15 is located with precision so that the point 14 where the wire enters the glass will be very precisely located. Conduit 15 may be heated.

After having been introduced into the glass by the guides 10 the flexible guides are subjected to the action of other elements which establish their routes, maintain their distance one from the other and even their height.

For thicknesses of the glass ribbon substantially inferior to 7 mm. it is advisable to use one or more pairs of fixed guides which compel the flexible guides to diverge and prevent them from again approaching one another under the action of surface tension. The guided flexible elements bear upon the fixed guides and keep the sheet at the width corresponding to the thickness which is desired in the finished sheet.

These spacers or fixed guides may have any desired form, for instance those illustrated in the drawings. A type which is very simple and generally satisfactory consists of vertical rods made of refractory material capable of resisting the friction and wear produced by the wires. Especially the said elements should be of such construction as to assist the reunification of the glass with the guide wires after their passage. Satsifactory results have been obtained with rods having an exterior diameter of 5–10 mm. composed of a cylindrical core of molybdenum or tungsten covered with a layer of alumina. The position of these spacers, vertically as well as horizontally, is assured by arm supports which permit their rapid change in position which enables one to change the dimensions of the sheets rapidly. The mounting may advantageously provide means for correcting their inclination and their level.

Especially when the spacers are placed in a region where the temperature of the glass may fall below 950° C., they may be provided with heating means which will permit the reheating of the glass in their immediate neighborhood, permitting the glass sheet to rejoin easily after having passed the guide.

Figure 8:
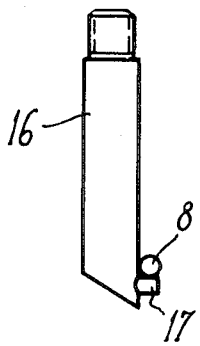
Figure 9:
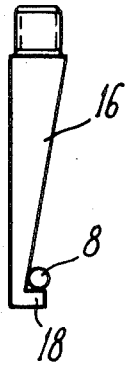
Figure 10:
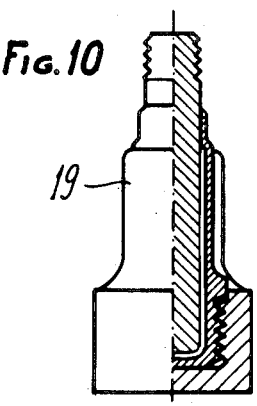
FIG. 10 is a view partly in section of a retaining element.

At 16 in FIG. 1 are shown two of these spacers. FIGS. 7-9 show examples of construction in which the spacers may be provided with projections which regulate vertical as well as horizontal position. The spacer of FIG. 7 regulates only horizontally; that of FIG. 8 regulates both vertical and horizontal position, the former by means of a stud 17; that of FIG. 9 regulates horizontally and vertically by configuration. As the ribbon of glass becomes thicker, spacers become less and less necessary and for thicknesses of glass substantially above 7 mm. one uses apparatus which opposes the spreading out of the glass. These buttresses may be constituted as spacers such as have previously been described and include heating means which permit the ribbon of glass to glide over their surfaces. Such buffers may be constructed as represented at 19 in FIG. 10 wherein the heating chamber is illustrated in the sectioned half.

Figure 12:
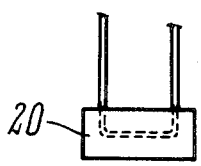
FIGS. 12 and 12a are elevational views of the face and profile of the guide buffers illustrated in FIG. 11.
Figure 12A:

In other forms of the invention the buttresses may be constituted by buffers with which the edges of the glass sheet come in contact. Such buttresses are preferably pieces of graphite carried by a pipe through which cooling fluid may flow as indicated in FIGS. 12 and 12a. They thus offer a surface of contact to the ribbon of glass to which the glass will not adhere.

Figure 11:
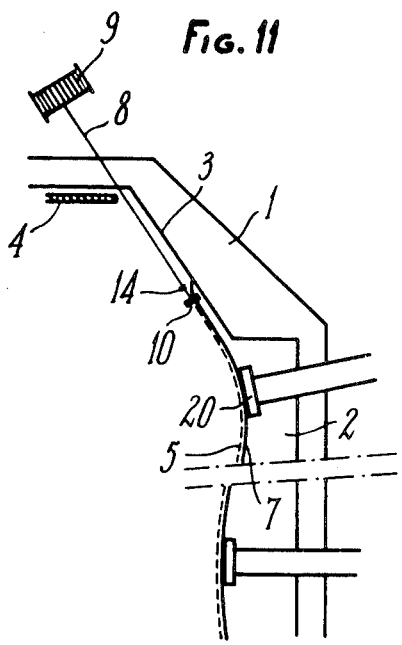
FIG. 11 is a view similar to FIG. 1 with additional apparatus for controlling the width of the glass ribbon.

In the installation according to FIG. 11 the glass is, as described above, brought into the bath at 4 and comes in contact with the divergent walls 3, then after having been put in contact with the mobile elements 8 they are retained between the said elements in a layer which continues to expand transversely. The sheet of glass then comes in contact with the buffers 20 which, taking into consideration the tension given to the flexible guide elements, establishes the width and consequently the mean thickness of the ribbon.

The borders of the glass sheet situated outside of the mobile elements, guide wires, have a thickness less than that of the main body of the sheet. Under the effect of the chilled buffers 20 the borders acquire a greater viscosity and participate in the retaining action of the thick glass, exercised by the mobile guide wires maintained under tension, and make that action uniform.

As shown in FIG. 13 one may introduce the flexible guides 8 into the ribbon immediately after it has left the divergent retainers 3 of the tank. This introduction may be made by passing the guide elements through the conduits 15 without the aid of the guides 10. These conduits deliver the said flexible guides into proximity to the surface of the glass at a very sharp angle.

In FIG. 14, which is similar to FIG. 6, there are placed between the guides 10 and the divergent walls 3 some refractory pieces 21 which form a barrier permitting the flexible guide elements to be placed at the edge of the sheet of glass and to keep the sheet out of contact with the downstream part of the wall 3. At 16 in that Figure are spacers which accelerate the widening of the sheet and stabilize the position of the wires. At 19 are exterior finger guides which act on the ribbon to give it a thickness superior to 7 mm. by forcing the edges of the sheet toward the center.

Generally speaking it is clear that according to the characteristics of the tank and of the manufacture carried out in it, the successive pairs of fixed guides which establish the paths of flexible guides may be of different kinds, imposing upon them progressively variable spacing and even local variations in width, notably with the object of correcting the transverse profile of the sheet with a subsequent extension to the original dimensions.

In order to improve the uniformity with which the glass is drawn between guide elements it is advantageous to raise their temperature above 500° C. and preferably near the temperature of the glass, that is to say about 1000° C. before putting them into contact with the glass. This disposition is applied particularly during the production of thin glass in which the intimate adherence between the glass and the mobile guide elements plays an essential role. Heating may be produced by any appropriate means such as direct Joule effect, induction high frequency, or passage of the elements through heated conduits or chambers.

FIG. 15 shows an arrangement which permits the heating of the guide wires, this being of the type which is the object of French Pat. No. 70 46155 filed in the name of Compagnie de Saint-Gobain—Pont A Mousson on Dec. 22, 1970. Every guide element 8 passes over a pair of wheels 22, 22a before entering the conduit 15 to be put into the glass. Adjustable electrical voltage furnished by a source 23 is applied behind the wheels 22, 22a on the one hand and an electrode 24 submerged in the metal flotation bath. The current passes through the guide wire which is heated by Joule effect.

The following examples are illustrative of the invention without limiting the generalities elsewhere herein expressed.

EXAMPLE 1

In a flotation furnace of the type shown in FIG. 15 fed by a glass melting furnace having a daily output of about 180 tons of molten glass, there has been placed those elements characteristic of the invention in the configuration shown in FIG. 15 with the object of making flat glass 7 mm. thick or less, the flexible metallic strands 8 being guide wires of mild steel 2 mm. in diameter.

The temperature of the wires before contact with the glass is about 1000° C.; the other parameters of operation are as follows:

Temperature of the glass fed to the bath, 1080 to 1150° C.;
Tension on the wires, 7.5 N;
Position of the wire supports 10: Axial distance 2.00 m. Distance from upstream wall 0.8 m.;
Position of the spreaders 16: Axial distance 3.00 m. Distance from upstream wall 1.6 m.

A second pair of spreaders 16 are disposed at 4 m. from the upstream wall to produce sheets having a width of 2.7 m. sheets of various thicknesses are produced by utilizing different speeds of production and different spacing of the downstream spreaders. The following table supplies the figures. Cooling in the flotation chamber is regulated to produce a temperature drop of the glass to about 600° C. at the discharge (downstream) end.

|  | Ex. 1A | Ex. 1B | Ex. 1C |
|---|---|---|---|
| Width of sheet | 2.7 m. | 2.7 m. | 2.7 m. |
| Thickness of sheet | 6.0 m. | 4.0 m. | 2.0 m. |
| Speed of sheet | 3.08 m./min. | 4.62 m./min. | 9.25 m./min. |
| Spacing of downstream spreaders | 2.9 m. | 3.10 m. | 3.30 m |

The products produced by this technique have transverse variations in thickness less than 1/10 mm. in the central area and up to 5 cm. from the edges, and an optical quality satisfactorily comparable to that of float glass produced by the processesses hereinabove referred to.

EXAMPLE 2

This example is quite similar to Example 1 but produces thick glass. As shown in FIG. 14 there is disposed between the wire supports and the diverging lateral walls refractory baffles 21 about 20 cm. long which allow the wires to be placed at the edges of the glass sheet and to keep it out of contact with the diverging walls. Spreaders are not used but finger hooks like that of FIG. 9 are disposed at 4 m.

from the upstream wall of the flotation chamber with a spacing of 2.5 m.

The different thicknesses of the glass sheet produced result from changes in the speed of the glass ribbon and in the tension applied to the wires. The other operational parameters are like those in Example 1.

|  | Ex. 2A | Ex. 2B | Ex. 2C |
|---|---|---|---|
| Width of sheet | 2.7 m | 2.7 m | 2.7 m. |
| Thickness | 8 mm | 10 mm | 15 mm. |
| Speed of sheet | 2.31 m./min | 1.85 m./min | 1.24 m./min. |
| Tension on wires | 1.2 kg | 1.4 kg | 1.5 kg. |

Up to a thickness of about 10 mm. practically identical results are obtained without the use of the finger hooks but good stability of the sheet is then achieved only by a more precise control of the tension on the wires.

The preliminary heating of the wires before admission to the glass ribbon is not essential to proper operation.

The products of this technique vary less than 1/10 mm. in thickness transversely up to 5 cm. from the edges, and have optical quality wholly equal to float glass produced by the techniques hereinbefore referred to.

As many apparently widely different embodiments of the present invention may be made without departing from the spirit and scope thereof, it is to be understood that the invention is not limited to the specific embodiments.

What is claimed is:

1. Apparatus for forming flat glass by flotation comprising a flotation tank having an upstream end and a downstream end, the tank being bounded adjacent its upstream end at least in part by divergent walls of material adapted to be wetted by molten glass, a flotation bath in the tank, means to deposit molten glass on the bath at a location near the upstream end of the tank from which location the glass spreads laterally while flowing longitudinally of the tank, movable filamentary edge-defining means for the glass extending lengthwise of the tank on opposite sides thereof, separate guide means guiding said filamentary edge-defining means into the molten glass from above at points downstream of said location and spaced apart by a distance larger than the width of the tank at said location, and further guide means to define paths of travel for said filamentary edge-defining means downstream of said separate guide means.

2. Apparatus according to claim 1 wherein said further guide means are more widely spaced apart than are said separate guide means.

3. Apparatus according to claim 2 in which the spacing of said separate guide means is about two-thirds the spacing of said further guide means.

4. Apparatus according to claim 1 including a barrier at each of said divergent walls to separate the molten glass from such wall.

5. Apparatus according to claim 1 in which said separate guide means comprise each an arcuate slotted guide which dips into the glass sufficiently to introduce one of said edge-defining means into the glass.

6. Apparatus according to claim 1 in which said further guide means define positions for said edge-defining means both vertically and horizontally.

7. Apparatus according to claim 1 in which said further guide means comprise each a buffer bearing on one edge of the glass, and means to cool the buffer.

References Cited

UNITED STATES PATENTS

| 3,326,653 | 6/1967 | Lajarte et al. | 65—99 A |
| 3,440,030 | 4/1969 | Thompson et al. | 65—99 A |
| 3,450,518 | 6/1969 | Itakura et al. | 65—182 R |
| 3,560,181 | 2/1971 | Lajarte et al. | 65—91 |

ROBERT L. LINDSAY, Jr., Primary Examiner

U.S. Cl. X.R.

65—91, 99A